United States Patent
Bouno

(10) Patent No.: US 10,135,564 B2
(45) Date of Patent: Nov. 20, 2018

(54) INFORMATION PROCESSING SYSTEM, INFORMATION PROCESSING PROGRAM, AND INFORMATION PROCESSING METHOD

(71) Applicant: DeNA Co., Ltd., Tokyo (JP)

(72) Inventor: Hironori Bouno, Tokyo (JP)

(73) Assignee: DENA CO., LTD., Tokyo (JP)

( * ) Notice: Subject to any disclaimer, the term of this patent is extended or adjusted under 35 U.S.C. 154(b) by 0 days.

(21) Appl. No.: 15/408,286

(22) Filed: Jan. 17, 2017

(65) Prior Publication Data

US 2017/0207879 A1 Jul. 20, 2017

(30) Foreign Application Priority Data

Jan. 15, 2016 (JP) ................................ 2016-005780

(51) Int. Cl.
*H04L 1/00* (2006.01)
*A63F 13/35* (2014.01)

(52) U.S. Cl.
CPC ............ *H04L 1/0006* (2013.01); *A63F 13/35* (2014.09); *H04L 1/0083* (2013.01)

(58) Field of Classification Search
CPC ....... H04L 1/0006; H04L 1/0083; A63F 13/35
See application file for complete search history.

(56) References Cited

U.S. PATENT DOCUMENTS

| | | | | |
|---|---|---|---|---|
| 6,999,673 B1* | 2/2006 | Kadono | ................ | H04N 19/20 |
| | | | | 348/398.1 |
| 7,131,048 B2* | 10/2006 | Suzuki | ................ | H04L 1/0045 |
| | | | | 714/748 |
| 2009/0213938 A1* | 8/2009 | Lee | ................ | H04N 19/70 |
| | | | | 375/240.24 |
| 2011/0002376 A1* | 1/2011 | Ahmed | ................ | H04N 19/61 |
| | | | | 375/240.01 |
| 2016/0094861 A1* | 3/2016 | Caron | ................ | H04N 19/70 |
| | | | | 375/240.16 |

FOREIGN PATENT DOCUMENTS

JP 04-006930 1/1992

OTHER PUBLICATIONS

Office Action for JP App No. 2016-005780 dated Feb. 4, 2016, 3 pgs.

* cited by examiner

*Primary Examiner* — Kyle Vallecillo
(74) *Attorney, Agent, or Firm* — Procopio, Cory, Hargreaves & Savitch LLP

(57) ABSTRACT

The information processing system comprises a server that divides up information into processing units that will not cause syntax errors during processing at a client, packetizes such that each set of divided information is contained in a single packet, and transmits the packets thus generated to the client.

4 Claims, 5 Drawing Sheets

MP of Player C

INFORMATION PROCESSING SYSTEM, INFORMATION PROCESSING PROGRAM, AND INFORMATION PROCESSING METHOD

This application claims foreign priority under 35 USC 119 based on Japanese Patent Application No. 2016-005780, filed on Jan. 15, 2016, the contents of which is incorporated herein in its entirety by reference.

BACKGROUND

1. Field

The present invention relates to an information processing system, an information processing program (e.g., non-transitory computer-readable medium having a storage including instructions to be performed by a processor), and an information processing method.

2. Related Art

There are known multiplayer online games which can be played by a plurality of players at the same time via the Internet or another such information communication network. With such an electronic game system in which processing is done online, the information used in the game is sent back and forth between a server and a client.

This information is divided up into a plurality of packets, and is transmitted either from the server to the client, or from the client to the server. For example, with a stream-socket protocol such as TCP/IP, as shown in FIG. 7, the information is divided up into packets P1 to Pn, and the packets are sent out in order from the server at time intervals $\Delta t$. Each packet arrives from the server to the client delayed only by a lag time t. For instance, a packet P1 sent out at the time t0 arrives at the time t1 after the lag time t, and the packet P2 sent out at the time t0+$\Delta t$ arrives at the time t2 (=t1+$\Delta t$) after the lag time t.

If an error should occur in the transmission or reception of a packet, a packet retransmission request is issued from the client to the server, and the packet in which the error occurred is retransmitted from the server to the client. At this point the lag time until the client receives the retransmitted packet is 2t(=2×[t1−t0]).

SUMMARY

Problems to be Solved by the Invention

With Internet games, information transmitted from the server is used in the execution of commands in the game application of the client.

For example, in a multiplayer game, game parameters for each user are provided, but the commands for each game parameter are executed at each client. As shown in FIG. 8, let us assume that the packet P1 contains the parameters for user A and user B and some of the parameters for user C, and that the packet P2 contains the remainder of the parameters for user C. If the packet P2 could not be received, some of the parameters for user C will be missing. If only some of the parameters for user C contained in the packet P1 are used to execute a command in this state, a syntax error may occur, preventing the processing related to the command from being executed. In view of this, a request to retransmit the packet P2 is issued from the client to the server, and the packet P2 is retransmitted from the server to the client. As a result, if the packet P2 retransmitted after a lag time is able to be received without error, processing is finally executed using the parameters for user C.

In view of this, it is an object of the present invention to provide an information processing system, information processing program (e.g., non-transitory computer-readable medium having a storage including instructions to be performed by a processor), and information processing method with which the occurrence of syntax errors during command execution can be suppressed, and processing can proceed smoothly.

Means for Solving the Problems

One aspect of the present invention is an information processing system that performs processing at a client by using information provided from a server over a network, wherein the server comprises: a packet generation means for dividing up the information into processing units that will not cause syntax errors during processing at the client and packetizing such that each set of divided information is contained in a single packet; and a packet transmission means for transmitting the packets generated by the packet generation means to the client.

Another aspect of the present invention is an information processing program (e.g., non-transitory computer-readable medium having a storage including instructions to be performed by a processor) that performs processing at a client by using information provided from a server over a network, wherein a computer is made to function as: a packet generation means for dividing up the information into processing units that will not cause syntax errors during processing at the client and packetizing such that each set of divided information is contained in a single packet; and a packet transmission means for transmitting the packets generated by the packet generation means to the client.

Another aspect of the present invention is information processing method with which processing is performed at a client by using information provided from a server over a network, wherein the server performs: packet generation processing for dividing up the information into processing units that will not cause syntax errors during processing at the client and packetizing such that each set of divided information is contained in a single packet; and packet transmission processing for transmitting the packets generated by the packet generation processing to the client.

It is preferable here for this to be information processing that provides a multiplayer game in which a plurality of players can participate over a network, wherein the packet generation means (processing) divides up the information by player and into processing units that will not cause syntax errors during processing at the client and packetizes such that each set of divided information is contained in a single packet.

It is also preferable if packet transmission from the server to the client is performed with a datagram socket.

Effects of the Invention

With the present invention, the occurrence of syntax errors in command execution that are attributable to packet reception errors in an electronic game can be suppressed, and processing can proceed smoothly.

DETAILED DESCRIPTION

Figure 1:
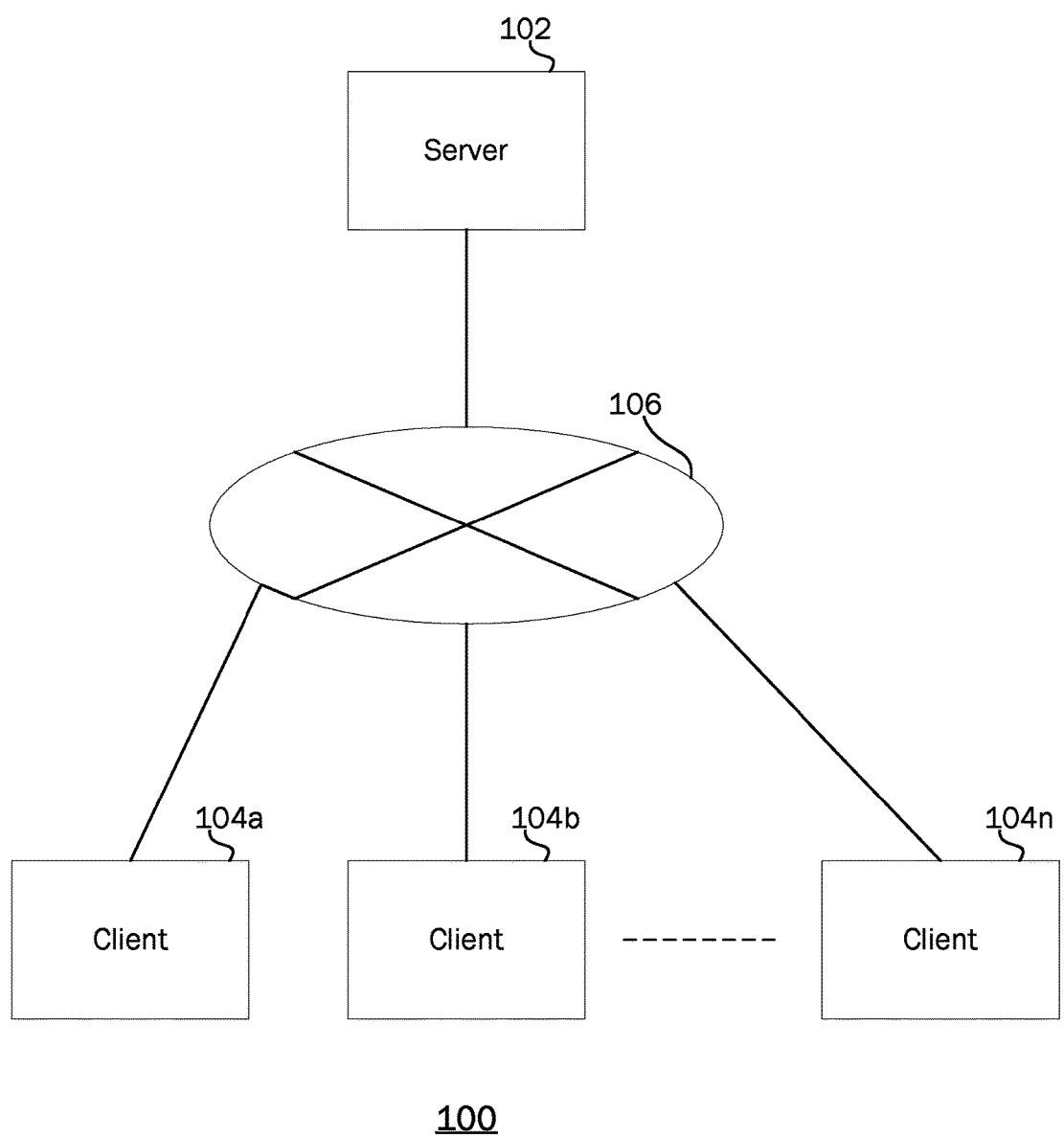
FIG. 1 A diagram illustrating the configuration of an information processing system in an embodiment of the present invention.

As shown in FIG. 1, an information processing system 100 in an embodiment of the present invention includes a server 102 and a client 104. The server 102 and the client 104 are connected via the Internet or another such information communication network 106 so that information can be exchanged. In this embodiment, we will describe a mode of providing a multiplayer game in which a plurality of players can participate from the server 102, and the server 102 is connected to a plurality of clients 104 (104a, . . . , 104n).

Figure 2:
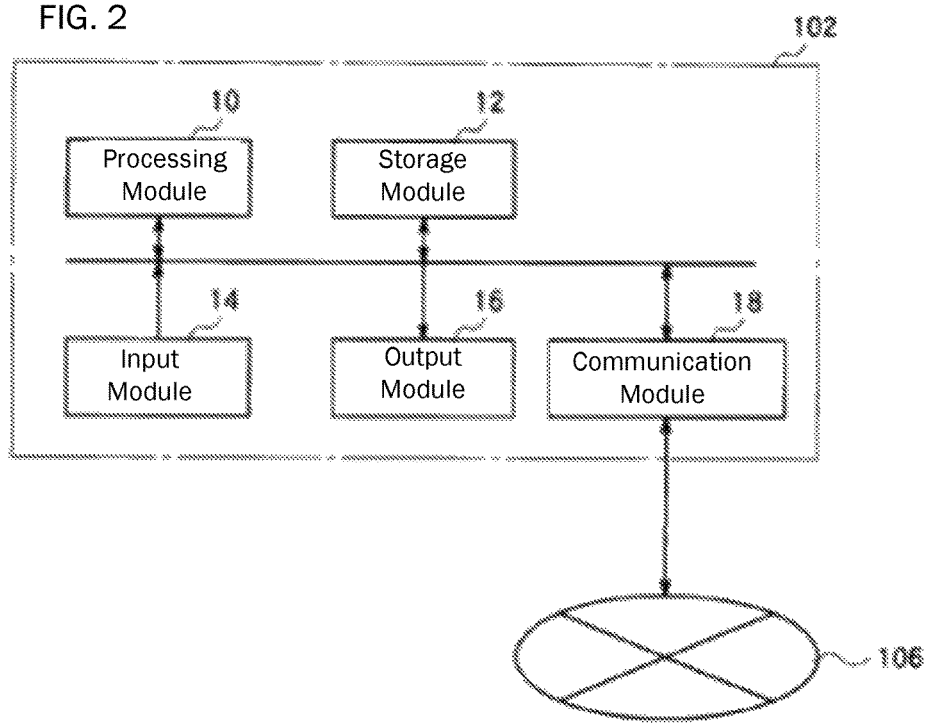
FIG. 2 A diagram illustrating the configuration of a server in an embodiment of the present invention.

As shown in FIG. 2, the server 102 includes a processing module 10, a storage module 12, an input module 14, an output module 16, and a communication module 18. The processing module 10 includes means for performing arithmetic processing, such as a CPU, or the like. The processing module 10 executes a game-provision program (e.g., non-transitory computer-readable medium having a storage including instructions to be performed by a processor) that is stored in the storage module 12, and thereby has the function of providing a multiplayer game in which a plurality of clients 104 are connected in the information processing system 100 of this embodiment. The storage module 12 includes storage means, such as a semiconductor memory, a memory card, or the like. The storage module 12 is accessibly connected to the processing module 10 and stores game-provision programs (e.g., non-transitory computer-readable media having a storage including instructions to be performed by a processor) and the information required for their processing. The input module 14 includes means for entering information. The input module 14 has, for example, a keyboard, a touchscreen panel, buttons, or the like for receiving input from the administrator. The output module 16 includes a user interface screen (UI), etc., for accepting input information from the administrator and means for outputting the results of processing by the server 102. The output module 16 is provided with a display that, for example, presents images to the administrator. The communication module 18 includes an interface for exchanging information with the client 104 via the information communication network 106. Communication via the communication module 18 may be either wired or wireless.

Figure 3:
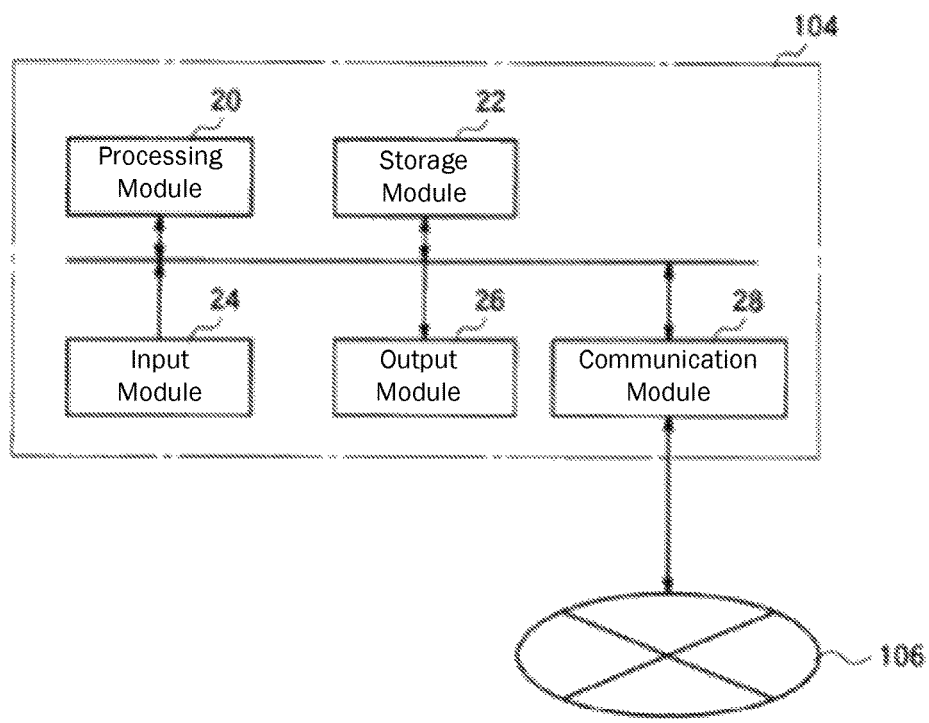
FIG. 3 A diagram illustrating the configuration of a client in an embodiment of the present invention.

As shown in FIG. 3, the client 104 includes a processing module 20, a storage module 22, an input module 24, an output module 26, and a communication module 28. The processing module 20 includes means for performing arithmetic processing, such as a CPU, or the like. The processing module 20 executes a client program (e.g., non-transitory computer-readable medium having a storage including instructions to be performed by a processor) that is stored in the storage module 22, and thereby functions as a multiplayer game terminal in the information processing system 100 in this embodiment. For example, the client program performs processing in a multiplayer game using information (game parameters, etc.) provided from the client 104 by utilizing a web browser function in the client 104. The storage module 22 includes storage means, such as a semiconductor memory, a memory card, or the like. The storage module 22 is accessibly connected to the processing module 20 and stores the client programs and the information required for their processing. The input module 24 includes means for entering information. The input module 24 has, for example, a keyboard, a touchscreen panel, buttons, or the like for receiving input from the user. The output module 26 includes means for outputting information that is required for processing at the client 104, such as a screen presenting posted information, or a user interface screen (UI) for receiving input information from the user. The output module 26 is provided with a display that, for example, presents images to the user. The communication module 28 includes an interface for exchanging information with the server 102 via the information communication network 106. Communication via the communication module 28 may be either wired or wireless.

The client 104 can be, for example, a personal computer, a tablet terminal, a smart phone terminal, a mobile telephone, or the like.

In this embodiment, a mode in which players A, B, and C play an electronic game using the clients 104a, 104b, and 104c connected to the server 102 will be described as an example.

In an electronic game, processing is performed for updating information (parameters, etc.) used in the game according to the play situation of the players A to C at the clients 104a to 104c. For example, the clients 104a to 104c transmit updated information to the server 102. The server 102 stores the updated information in the storage module 12 and manages this information, and also compiles the information received from the clients 104a to 104c and transmits it to the clients 104a to 104c.

Figure 4:
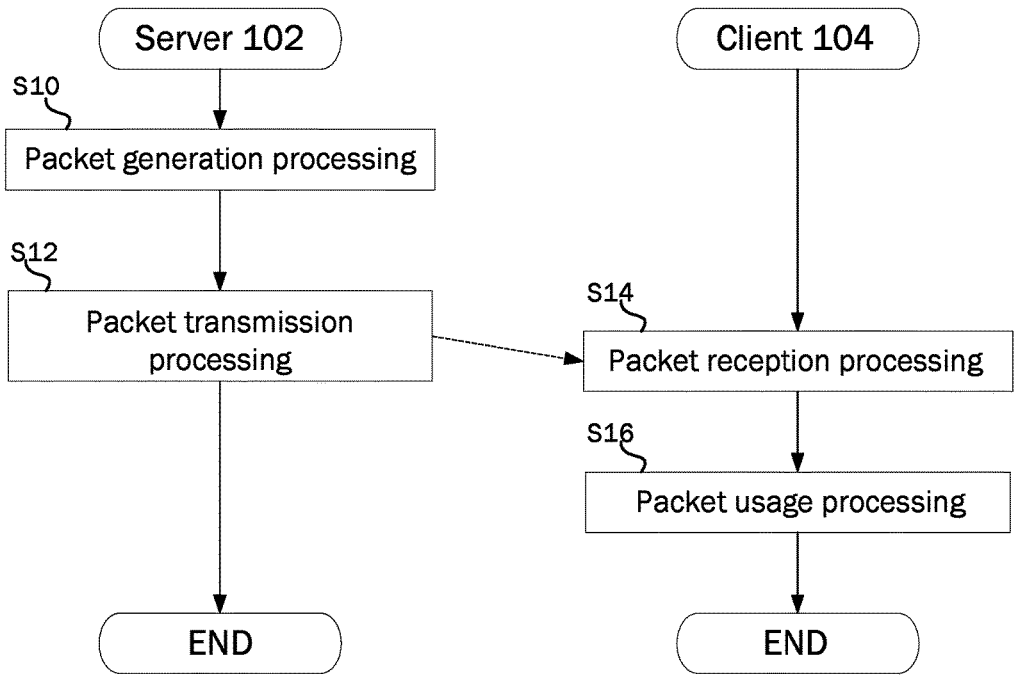
FIG. 4 A flowchart of packet transmission and reception processing in an embodiment of the present invention.

The processing when information is transmitted from the server 102 to the clients 104 will now be described through reference to the flowchart in FIG. 4.

In step S10, information transmitted from the server 102 to the clients 104 is packetized. The processing in this step causes the server 102 to function as a packet generation means. The processing module 10 reads information related to the game for the clients 104a to 104c stored ahead of time in the storage module 12, and packetization is performed by dividing up the information into a transmission unit size according to a communication protocol.

For example, with TCP packets, after the information has been divided up into a size that allows transmission as a data component, sequence numbers are assigned to the divided information, in order starting from the front. Packets are then generated in which a transmission source port number, a destination port number, a sequence number, an ACK number, or other such headers are attached for each set of divided information.

Also, with UDP packets, for example, the information is divided up into a size that allows transmission as a data component. Packets are then generated in which a transmission source port number, a destination port number, message length, or other such headers are attached for each set of divided information.

In this embodiment, the information is divided up into processing units that will not cause syntax errors during processing of the electronic game application at each client 104 and packetized such that each set of divided information is contained in a single packet. Specifically, the information contained in a single packet is comprised as a unit that allows each client 104 to execute the commands of the electronic game application with only the information contained in that packet. In other words, packetization is performed by dividing up the information such that the information contained in other packets is not needed to execute a command using the information contained in the one packet.

Figure 5A:
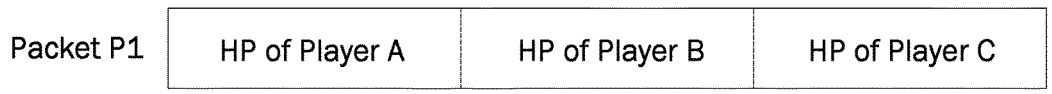
FIGS. 5(a) and 5(b) A diagram illustrating a packet configuration method in an embodiment of the present invention.
Figure 5B:
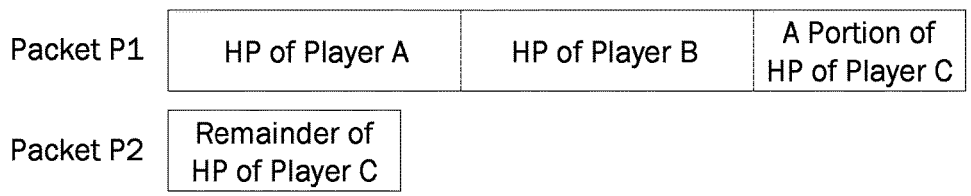

For example, if there is a command in the electronic game application of a client 104 to combine the hit points (HP) of the players A to C and display the hit points (HP) as a single argument on the screen, then as shown in FIG. 5*a*, packetization is performed such that the combined data of the hit points (HP) of the players A to C is contained in a single packet. Specifically, as shown in FIG. 5*b*, packetizing such that the hit points for the players A to C are divided up into different packets is avoided.

Figure 6A:
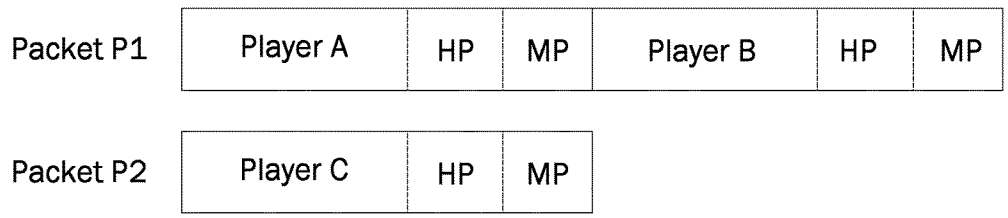
FIGS. 6(a) and 6(b) A diagram illustrating a packet configuration method in an embodiment of the present invention.
Figure 6B:
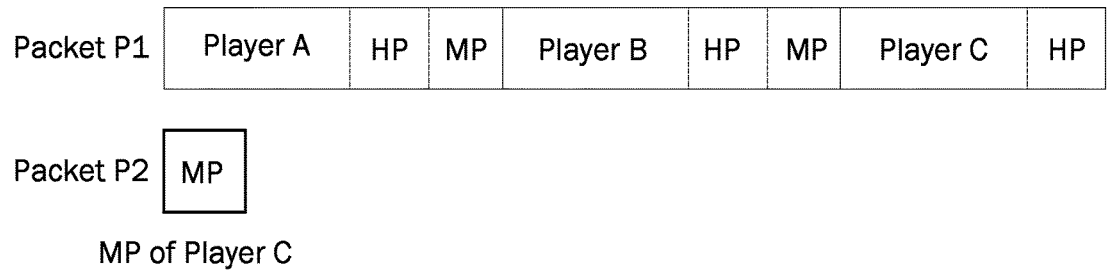
Figure 7:
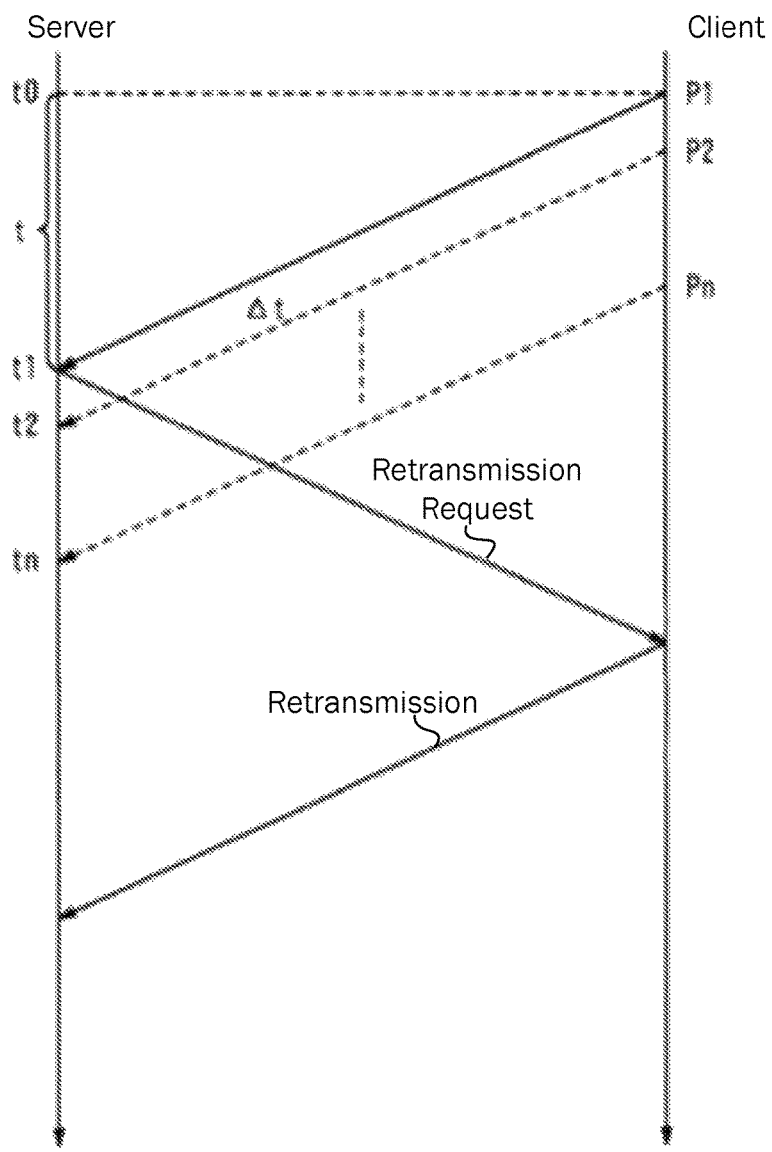
FIG. 7 A diagram illustrating packet transmission, reception, and retransmission.
Figure 8:
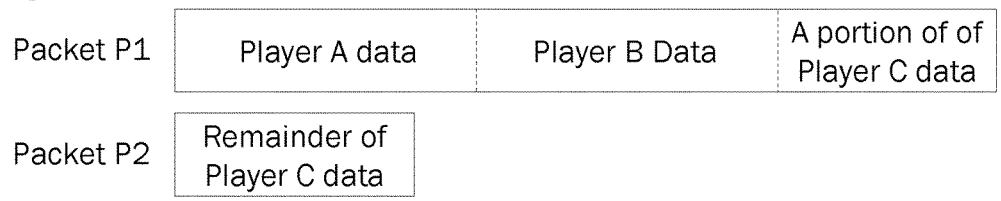
FIG. 8 A diagram illustrating a conventional packet configuration method.

Also, for example, if there is a command in the electronic game application of a client 104 to combine the hit points (HP) and the magic points (MP) for each of the players A to C and display the hit points (HP) as a single argument on the screen, then as shown in FIG. 6*a*, packetization is performed such that the combined data of the hit points (HP) and the magic points (MP) for each of the players A to C is contained in a single packet. Specifically, as shown in FIG. 6*b*, packetizing such that the hit points (HP) and the magic points (MP) for each of the players A to C are divided up into different packets is avoided.

The packetization of information is not limited to or by these examples, and any packetization that is performed by dividing up the information contained in each packet into processing units that will not cause syntax errors during processing of the electronic game application at each client 104, such that each set of divided information is contained in a single packet, is acceptable.

In step S12, the packets are transmitted from the server 102 to the clients 104. The processing in this step causes the server 102 to function as a packet transmission means. The server 102 transmits the packets generated in step S10 through the communication module 18 to the clients 104*a* to 104*c* used by the players A to C participating in the game.

In step S14, the packets are received by the clients 104. The processing in this step causes the clients 104 to function as packet reception means. The clients 104*a* to 104*c* receive the packets transmitted from the server 102 in step S12, via the communication module 28.

At this point, a reception error may occur, in which a packet cannot be received due to a malfunction of the Internet or other information communication network, or a problem with the communication module 18 or the communication module 28, or the like. In such a case, the client 104 issues a retransmission request of the server 102, specifying the packet that could not be received. Upon receiving the packet retransmission request, the server 102 retransmits the packet in question.

In step S16, processing is performed that makes use of the information contained in the packet. The processing in this step causes the clients 104 to function as game advancement means. The clients 104*a* to 104*c* use the information contained in the packets received in step S14 to execute the commands of the electronic game application and advance the electronic game.

At this point, in this embodiment, processing is able to proceed with only the information contained in a single packet since the information is divided up into processing units that will not cause syntax errors during processing of the electronic game application at each client 104 and packetized such that each set of divided information is contained in a single packet. Therefore, even if an error should occur in the transmission or reception of a packet, and packet loss occurs, only the information contained in the packets that could be received may be used so that the processing can proceed without any syntax errors occurring in the processing of the electronic game application.

If, as in FIG. 5*b* or FIG. 6*b*, information that has been divided up into processing units that will not cause syntax errors is contained in separate packets and one of those packets could not be properly received, the information contained in the other packets must be stored in a buffer or the like until a retransmission request for that packet is issued and the packet is retransmitted from the server 102. By contrast, if, as in this embodiment, the information is divided up into processing units that will not cause syntax errors during processing of the electronic game application and packetized such that each set of divided information is contained in a single packet, even if one packet could not be properly received, the information contained in the other packets does not need to be stored.

In particular, with a UDP or other such datagram socket protocol, since there is no need to receive the packets in order, even if packet loss should occur during transmission or reception, the loss will not be a problem, and only the information contained in the packets that could be received may be used to allow the processing at the clients 104 to proceed.

In this embodiment an example of an information processing system was described, but the applicable range of the present invention is not limited to or by this, and the invention can be applied to any system that transmits and receives information over an information communication network. For example, the present invention can also be applied to a multi-chat system that allows a plurality of users to chat, a multi-voice chat system in which a plurality of users chat by voice, or the like. The effect of the present invention is particularly pronounced in systems that need to have good real-time properties, in which delays in processing due to packet loss pose a problem.

DESCRIPTION OF THE REFERENCE NUMERALS

10 Processing module, 12 Storage module, 14 Input module, 16 Output module, 18 Communication module, 20 Processing module, 22 Storage module, 24 Input module, 26 Output module, 28 Communication module

The invention claimed is:

1. An information processing system that provides a multiplayer game in which a plurality of players can participate over a network, and performs processing at a client by using information provided from a server over the network, wherein the server is configured to perform packet generation, by dividing up the information by player in the multiplayer game and into processing units that will not cause syntax errors during processing at the client, and packetizing, such that each set of divided information is contained in a single packet;

and the server is configured to perform packet transmission, for transmitting the packets generated by the packet generation, to the client, wherein the client is configured to execute a command for the multiplayer game associated with each of the packets received.

2. The information processing system according to claim 1,
wherein packet transmission from the server to the client is performed with a datagram socket.

3. An information processing non-transitory computer-readable medium having a storage including instructions to be performed by a processor that provides a multiplayer game in which a plurality of players can participate over a network and performs processing at a client by using information provided from a server over the network,
wherein a processor is configured to perform the functions of:
dividing up the information into processing units by player in the multiplayer game, and that will not cause syntax errors during processing at the client and packetizing such that each set of divided information is contained in a single packet; and
transmitting packets generated by the dividing, to the client that is configured to execute a command for the multiplayer game associated with each of the packets received.

4. An information processing method with which a multiplayer game in which a plurality of players can participate over a network is provided and processing is performed at a client by using information provided from a server over the network,
wherein the server performs:
packet generation processing for dividing up the information by player in the multiplayer game and into processing units that will not cause syntax errors during processing at the client and packetizing such that each set of divided information is contained in a single packet; and
packet transmission processing for transmitting the packets generated by the packet generation processing to the client;
wherein the client performs execution of a command for the multiplayer game associated with each of the packets received.

* * * * *